United States Patent [19]

Gerke et al.

[11] 3,739,101

[45] June 12, 1973

[54] CROSS FIELD SYSTEM WITH BISTABLE POLARIZED RELAYS

[75] Inventors: Peter Gerke, Grafelfing; Helmuth-Joachim Bock, Munchen; Anton Sennefelder, Gilching, all of Germany

[73] Assignee: Siemens Aktiengesellschaft, Berlin and Munich, Germany

[22] Filed: Jan. 12, 1971

[21] Appl. No.: 105,795

[30] Foreign Application Priority Data

Jan. 13, 1970 Germany .................. P 20 01 353.0

[52] U.S. Cl. .......................................... 179/18 GE

[51] Int. Cl. .......................................... H04q 3/48

[58] Field of Search ................................ 179/18 GE

[56] References Cited

UNITED STATES PATENTS

| | | | |
|---|---|---|---|
| 3,462,653 | 8/1969 | Koeman | 179/18 GE |
| 3,536,843 | 10/1970 | Arndt | 179/18 GE |

FOREIGN PATENTS OR APPLICATIONS

| | | | |
|---|---|---|---|
| 1,227,289 | 3/1971 | Great Britain | 179/18 GE |
| 1,296,214 | 5/1969 | Germany | |

*Primary Examiner*—William C. Cooper
*Attorney*—Birch, Swindler, McKie & Beckett

[57] ABSTRACT

A switching arrangement for telephone exchange installations having coupling multiples of the cross-field type constructed using coupling contacts of bistable polarized coupling relays, particularly, holding relays, is described. The coupling relays are selectively engageable and returnable. Each relay has a coil end connected directly to markable row input leads and the other coil end connected over two oppositely poled diodes with a column engagement lead. Each such column lead is individually markable and has an equivalent column return lead. When a coupling relay is marked for engagement or return, a marking voltage source is connected to a row input lead, and the marking voltage source is connected to a column engagement lead or a column return lead and to ground. A first blocking potential equal to or of opposite polarity relative to the functional voltage at the marked column engagement lead is connected to the unmarked column return or engagement leads. At the unmarked column engagement or return leads, a second blocking potential is applied, which is equal to or of opposite polarity to the potential at the marked row input lead. Additionally, the unmarked row input leads are connected to a third blocking potential which is equal to or in opposite polarity to the potential at the marked column engagement or column return lead.

5 Claims, 2 Drawing Figures

PRIOR ART

CROSS FIELD SYSTEM WITH BISTABLE POLARIZED RELAYS

BACKGROUND OF THE INVENTION:

This invention relates to a switching arrangement for telephone exchange installations, particularly, telephone exchange installations having coupling multiples constructed of the cross field type from coupling contacts of bistable polarized Relays. Retention type relays are especially useful for this purpose. The coupling relays in the coupling multiples are selectively individually engageable as well as returnable. In each of the various relay windings one winding end is connected directly to individually markable row input leads and the other ends of the windings are connected individually over two oppositely poled diodes, each having one column engagement line per column and individually markable per column, and each having an equivalent column return line. In this arrangement, a marking voltage source will be connected with minus- or plus- to a row input lead and with plus to a column engagement lead or with minus to a column return lead, by the marking of coupling of relays for their return or engagement.

A switching arrangement of this type is already known through the published Dutch Pat. application No. 69.04234 (corresponding to British Pat. Specification No. 1,227,056). Reference is made only to FIG. 3 of the drawings in the aforementioned Dutch Patent application.

One problem in control fields of this type is the extent of the effect of switching errors, particularly, those which occur during the operation. This includes especially errors arising from defects in the decoupling diodes. Diode defects comprise, as a rule, either a complete current path interruption or a complete internal short circuit. In the latter case the internal resistance in both current directions is nearly zero.

The problem is thus presented of limiting defects of this type in decoupling diodes in control matrixes of the type described hereinabove in their effect on the coupling relays which lie at the same cross point. A diode defect which consists of a complete current path interruption or open circuit is fundamentally limited in its effect to the coupling relays which lie at the same coupling point, and indeed it even affects only the function in which the pertinent diode is to be conducting. A diode defect which consists of a complete internal short circuit of a decoupling diode presents a more serious problem. In the above discussed known circuit arrangement (switching arrangement), in case of a defect of a decoupling diode lying at a certain coupling point, an undesired circuit will be formed, by the marking of a coupling relay at another coupling point, through which an erroneous activation of coupling relays on two other coupling points will be brought about. In order to describe the error situations which arise under such circumstances, the known circuit arrangement is shown herein in FIG. 1. Described below are two error cases, which produce different effects.

It is assumed herein, for purposes of description, that a decoupling diode at a certain coupling point is defective, and that a coupling relay at a coupling point is being marked. This coupling point lies in the same row, but is in a different column from the defective diode. Referring to FIG. 1, it is assumed that the coupling relay K11′ is to be engaged. For this purpose the marking contacts *z*1′, 1*s*1′ and 2*s*1′ and the control contacts 43′ and 44′ are activated. A current will be passed through the lines *u*2′, *zz*1′, *se*1′, and *u*3′, and it flows through the relay K11′ and the decoupling diode Ge11′. The coupling relay K11′ is thereby activated to be engaged.

It is further assumed that the decoupling diode *Gp*12′ is defective in such a manner that it will pass current in the blocking direction with little resistance. An additional circuit between the named row input lead *zz*1′ and the named column input lead *se*1′ is thereby created along with an additional circuit which connects the coupling relays K12′, K*n*2′ and K*n*1′ over the decoupling diodes G*p*12′, G*pn*2′ and G*en*1′, in which the relays K12′ and K*n*1′ receive engagement activation and the relay K*n*2′ receives return activation. As has been previously explained, it is fundamentally unavoidable, that a relay at a coupling point with a defective diode will be erroneously activated; however, further coupling relays may experience no erroneous activation. This applies, however, in the present case of the diode G*p*12′ for the coupling relays K*n*2′ and K*n*1′ in case of the engagement marking of the coupling relay K11′. A similar situation results, when the relay K11′ receives return activation and the diode G*e*12′ is defective in the described manner.

The next assumed case to be discussed is where a coupling relay receives engagement activation and a diode at a coupling point in a different row and column from the marked relay is defective in the described manner. It is assumed, once again, that the coupling relay K11′ receives engagement activation. Further, it is assumed that the decoupling diode G*en*2′ is defective in the described manner. In this case a circuit is completed which runs over the coupling relays K12′, K*n*2′ and K*n*1′ and over the decoupling diodes G*e*12′, G*en*2′ and G*en*1′. In this circuit the coupling relays K12′ and K*n*1′ once again receive engagement activation, the coupling relay K*n*2′ in comparison receives return activation.

The problem of limiting this type of defect in decoupling diodes in control matrixes of the type described in the introduction in their effect to the coupling relays lying at the same cross point has special meaning for circuit arrangements, as are known, for example, through the German Pat. No. 1,296,214, which shows a plurality of separate coupling multiples, each having control matrixes constructed of the cross field type similar to the type described in the introduction, once again in cordinate form, whereby the row input leads — or column input leads — of a plurality of coupling multiples arranged in one of the rows parallel to the row — or column — are commonly assigned to the same. In this case the defect of a decoupling diode makes not only the two cordinate leads which can be connected at the assigned coupling point, e.g., conversation circuits, of the one individual coupling multiple unuseable, but also all corresponding cordinate leads in the other coupling multiples in the same row of coupling multiples corresponding to the row input lead and in the same row of coupling multiples corresponding to the column input lead.

SUMMARY OF THE INVENTION

In order to provide a solution to the aforementioned problems by marking of coupling relays for their engagement — or return — simultaneously:

a. a first blocking potential will be connected to the column return leads — or column engagement leads — of the other, i.e., unmarked, columns, which is equal or positive — or equal or negative — with respect to the function al potential at the marked column engagement lead — or column return lead.

b. a second blocking potential will be connected at the column engagement leads — or column return leads — of the other, i.e., unmarked, columns, which is equal or negative — or equal or positive — with respect to the functional potential at the marked row input lead, and c. a third blocking potential will be connected to the unmarked row input leads, which is equal or positive — or equal or negative — with respect to the functional potential at the marked column engagement lead — or column return lead.

The invention has the effect that diode defects in engagement matrixes of the type described in the introduction are limited in their effect to the relays lying at the same coupling point. Should a diode defect arise, use of the invention permits one merely to block the row lead and column lead which pass through the pertinent coupling point against a displacement to bring about conversation-type connection.

BRIEF DESCRIPTION OF THE DRAWINGS

The invention will be best understood by reference to a description of the problems in prior art circuitry given hereinabove and a description of a preferred embodiment of the invention given hereinbelow in conjunction with the drawings in which.

DETAILED DESCRIPTION OF THE INVENTION

Figure 1:
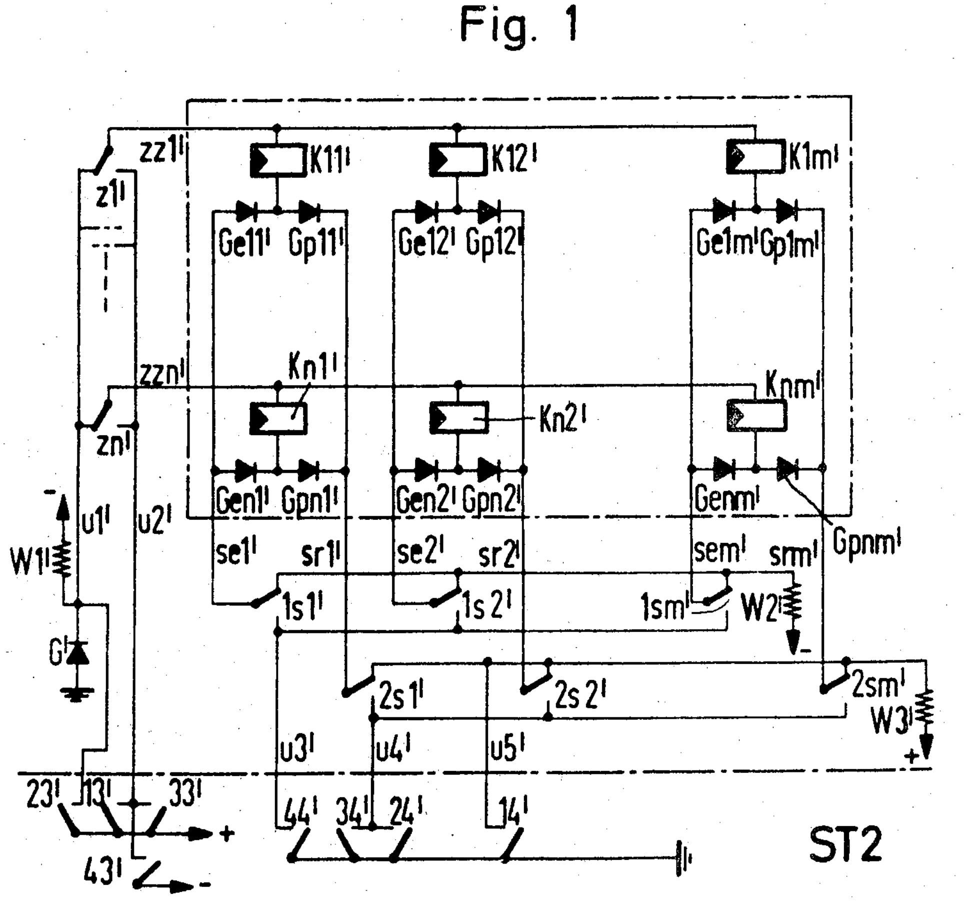
FIG. 1 is a schematic diagram of the circuitry in a prior art cross-field coupling multiple and, FIG. 2, a schematic diagram of the circuitry of a preferred embodiment of the invention is shown comprising only those component parts which contribute substantially to its understanding.
Figure 2:
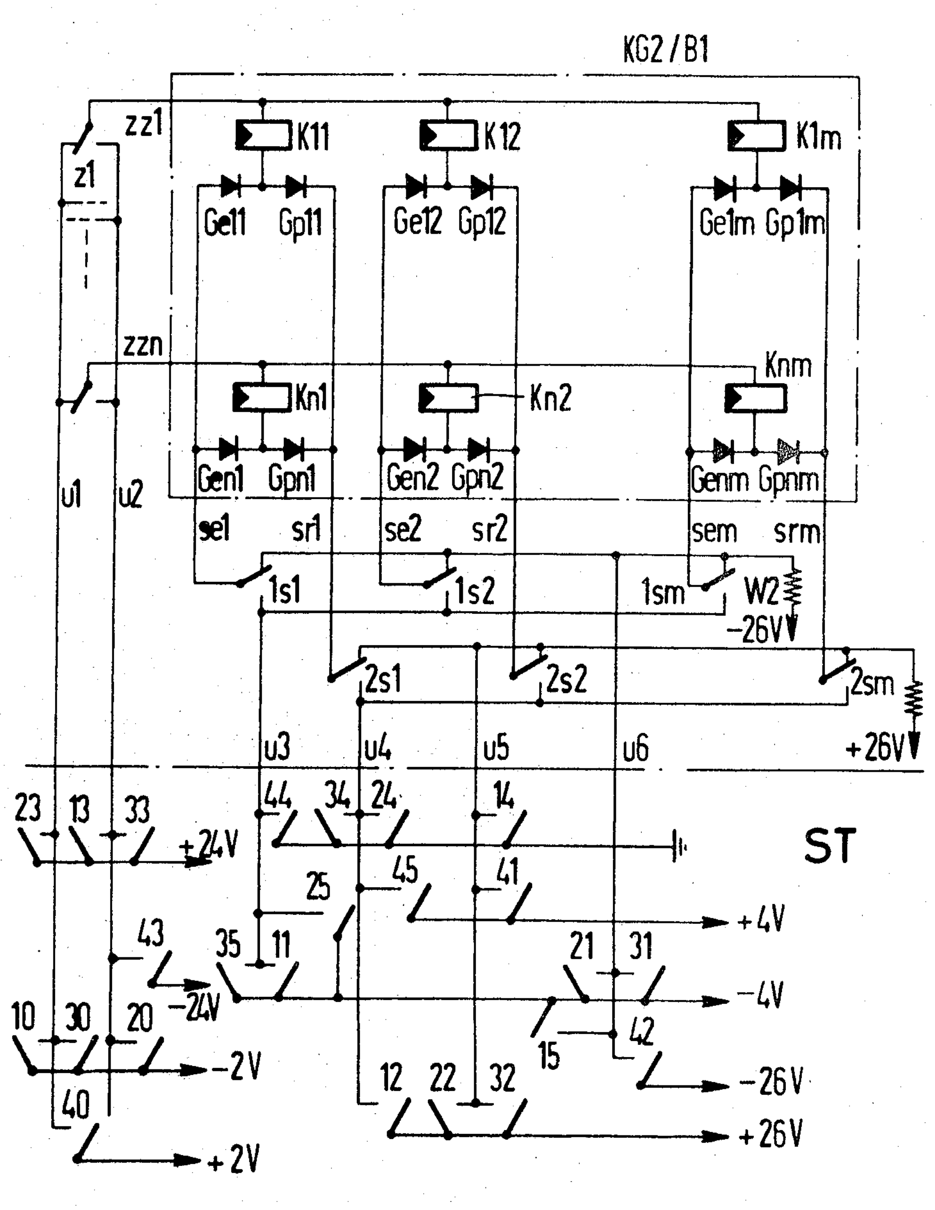

In FIG. 2 the engagement network of a coupling multiple is shown. This coupling multiple is illustrated in the form of conversation circuits which can be connected with each other through row leads and m column leads. Corresponding thereto *n* row leads zz1 through zzn for the switching (connecting) of the coupling relay coils are envisioned for the marking of the coupling relays for their engagement and return. The doubled number (that is double the number *m*) of column input leads which serve for the marking of the coupling relays for their engagement and return correspond to the *m* columns. Two column input leads are assigned, therefore, to each column. For example, to the first column of coupling relays K11 through K*n*1 (are assigned) the column input leads *se*1 and *sr*1. The column input leads se1 through sem serve the engagement of the coupling relays, while the column input leads *sr*1 through srm serve the return of the coupling relays.

The row input leads *zz*1 through *zzn* are individually connected with the center terminals of row marking contacts *z*1 through *zn*, which are constructed as switch over contacts. The column inputs leads are also individually connected with the center terminals of the column marking contacts constructed as switch over contacts. The rest or inactive sides of all row marking contacts are commonly connected to a control line *u*1. The working or active sides of all row marking contacts are commonly connected to a control line *u*2. These control leads are routed to an engagement device. The working sides of all of those column marking contacts whose center terminals are connected with the column input leads *se*1 through sem which serve the engagement of the coupling relays are commonly connected to a control lead *u*3. The rest sides of all those column marking contacts 2*s*1 through 2*sm*, whose center terminals are connected to the column input leads *sr*1 through *srm* which serve the return of the coupling relays are commonly connected to a control lead *u*5. The working sides of the last named column marking contacts are commonly connected to a control lead *u*4. These three control leads *u*3, *u*4 and *u*5 are also routed to the engagement device ST. In the same way it is also possible to run each of the row and column marking contacts, which are developed as switch over contacts next to the named control leads into the engagement device ST. In this case the row input leads and the column input leads lead to the engagement device.

To produce a connection over a row lead and a column lead of a coupling multiple it must next be taken care of that in the pertinent row and in the pertinent column no other holding type relay is engaged. This can unquestionably be the case, because as is already known through the named Dutch patent application, after the termination of a connection, the coupling relays engaged theretofore can remain engaged and will first be returned in case of a newer production of a connection over the corresponding row input lead and column input lead. Therefore, before the engagement of a coupling relay all coupling relays which belong to the same row and which belong to the same column receive a return activation. In the above circumstance, the contacts 10 through 45 will be successively closed by the coupling group control ST.

It is assumed, that the row marking contact z1 and the common column marking column contacts 1*s*2 and 2*s*2 which belong to one and the same relay are activated. Accordingly, the coupling relay K12 is to be engaged. However, all of the coupling relays K11 through K1*m* and K12 through K*n*2 must be returned.

First, the contacts 10 through 15 are closed by the engagement device ST. Ground potential passes over the rest sides of the column marking contacts 2*s*1 through 2*sm*, with the exception of the activated column marking contact 2*s*2, over the diodes G*p*11 through G*pnm*, with the exception of the diode G*p*12 through G*pn*2, and to all of the coupling relays K11 through K*nm*, with the exception of the coupling relays K12 through K*n*2. The positive potential, which to this point in the rest condition has been applied to the rest side of the named column marking contact over the resistance W3 in a high resistance manner for the purpose of forming of the decoupling diode, can no longer have an effect. A potential of +24 volts passes over the contact 13 and the closed working side of the row marking contact *z*1 to all coupling relays K11 through K1*n*. A return current flows over these coupling relays and over the diodes G *p*11 through G*p*1*m* poled in the direction of passage, with the exception of the coupling relay K12 and the diode G*p*12, during the closing time of the contacts 13 and 14. Those of the named relays which were engaged return to their rest position. The closing time of the contacts 13 and 14 is so measured that is suffices with safety for the coupling relay return.

After the engagement device ST has reopened the contacts 13 and 14, it closes the contacts 23 and 24. Now, the control line *u*4, the closed working side of the column marking contact 2*s*2 and the diodes G*p*12 through G*pn*2 and all of the coupling relays K12 through K*n*2 are at ground potential. A potential of +24 volts passes over the contact 23, the control lead *u*1 and the rest side of the unactivated row marking contacts and over all of the row input leads with the exception of the row input lead *zz*1 to all of the coupling relays, with the exception of the coupling relays K11 through K1*m*. The coupling relays of the second column, with the exception of the coupling relay K12, receive return activation. If any of the latter relays was engaged it will be returned.

The engagement device ST opens once again the contacts 23 and 24 and closes instead the contacts 33 and 34. A return current flows through the coupling relay K12 over these contacts, the control leads *u*2 and *u*4, the working sides of the row marking contact *z*1 and the column marking contact 2*s*2 and over the diode G*p*12. If K12 was still engaged, it will be returned.

It is possible to undertake the precautionary return of the coupling relay which thereafter is to be engaged at the same time as the return of all of the relays of a row or at the same time will all of the relays of a column. In the same way it is also possible to completely omit the precautionary return of the coupling relay which thereafter is to be engaged. Through each of these three measures the engagement process which consists of a total of 4 switching steps can be reduced to three switching steps.

After the engagement device ST has once again opened its contacts 33 and 34, it closes the contacts 43 and 44. A negative potential of 24 volts passes over the contact 43, the control lead *u*2, the working side of the activated row marking contact *z*1 and over the row input lead *zz*1 to the coupling relay K12. The contract 44, the control lead *u*3, the working side of the activated column marking contact 1*s*2, the column input lead *se*2, the diode G*e*12 and the coupling relay K12 are at ground potential. The coupling relay K12 receives then an engagement impulse which will be once again ended by the opening of the contacts 43 and 44. Because the coupling relays are constructed as holding type relays, after the coupling relay K12 has taken its working position, it maintains that position. Over the contacts of relay K12 (not shown), it connects the row lead corresponding to the row input lead *zz*1 and the column lead corresponding to the column input leads *se*2 and *sr* 2. In this manner, connections will be completed in coupling multiples of a coupling field or switching matrix.

In the foregoing material different marking processes for the engagement and the return of coupling relays has been described in a general manner without direct reference to the invention. The invention characteristics of the circuit arrangement according to FIG. 2 will be hereinafter explained.

As described, the contacts 10 through 45 will be activated for the engagement of a coupling relay in four successive switching phases. In the first switching phase the contacts 10 through 15, in the second switching phase the contacts 20 through 25, in the third switching phase the contacts 30 through 35 and in the fourth switching phase the contacts 40 through 45 of the engagement device ST will be activated. The named contacts will be returned to their rest position at the end of a given switching phase. The contacts activated during a switching phase will be simultaneously closed and simultaneously opened. Any possible contact activation time losses lie far below the reaction time of the coupling relays. The named control contacts of the engagement device ST may advantageously be constructed as electronic switches, for example, in the form of transistors.

The effect of diode defects resulting in the low resistance conduction of current in the blocking direction will now be discussed. To permit a ready understanding of these relationships and processes, the circuit conditions given in the named fourth switching phase will be discussed in conjunction with the other three switching phases. As was previously explained, during the fourth switching phase not only the contacts 43 and 44, but also the contacts 40, 41, 42 and 45 of the engagement device ST are activated. The previously described example of the engagement of the coupling relay K12 will be used for the description hereinbelow. It has been indicated that during the fourth switching phase, the coupling relay K12 receives engagement activation.

It is assumed that the diode G*p*11 is defective in the described manner. Insofar, that the potential of +4 volts was not connected in this switching phase over the contact 41 of the engagement device ST to all the unmarked column input leads which serve the return of the coupling relays (in this case they are the column input leads *sr*1 through srm with the exception of the column input lead *sr*2), an undesired circuit would be brought about. This circuit would run from the marked row input lead *zz*1 over the coupling relay K11, the defective diode G*p*11, the diode G*pn*1, the coupling relay K*n*1, the coupling relay K*n*2, the diode G*en*2, the column input lead S*e*2, the marking contact 1*s*2, the control lead *u*3 and the contact 44 of the engagement device ST. This circuit would be only one of a plurality of similar types of circuits over all of the other coupling relays, which lie in the same column with the coupling relay K*n*1. The defect in the diode G*p*11 would have then the result that a multiplicity of relays would erroneously receive an engagement activation or a return activation. However, because during the fourth switching phase the potential of +4 volts will be connected over the contact 41 of the engagement device ST, over the control lead u5 and the rest side of the unactivated column marking contacts, for example, 2*s*1, to the column input lead *sr*1, only the coupling relay K11, that is the one which lies at one and the same coupling point with the defective diode will be erroneously activated. The diodes G*pn*1 and G*en*2 named in the above circuit description, however, remain blocked. Thereby, any effect of the defeat of the diode G*p*11 on the other coupling relays will be blocked.

Corresponding circuits would be brought about in the other three switching phases in the absence of the use of the invention described herein, if in these cases one of the diodes G*e*11 through Genm in one of those columns was defective in the described manner, in which no column input lead is connected over the marking contact to the ground potential. Defects of these diodes would be limited, however, in the first three switching phases, in their effect in the same way to the coupling relay lying on one end the same given coupling point. That is, in the first switching phase over contact 11 in the second switching phase over contact 21 and in the third switching phase over contact 31 a negative potential of 4 volts will be connected with ground potential over marking contacts which serve for the engagement of the coupling relays. In this manner it should be especially pointed out, that the potential of +4 volts, or −4 volts, will be routed to the pertinent column input lead which serves the return of the coupling relay, or the engagement of the coupling relay, over the marking contact and over the control lead which connects together their working sides, or rest sides. For the application of these potentials, the marking contacts and the control leads common to them will be utilized in an advantageous manner. The same is also true for the relays of the control device ST which carry control contacts.

The case where a defective diode lies in an unmarked row and an unmarked column will not be considered. This situation where the coupling relay K12 is to be engaged will again be described. As was previously described, in this case the coupling relay K12 will be marked during the fourth switching phase; it receives engagement activation. It is further assumed, that the diode G*en*1 is defective. If the invention were not used an undesired circuit would thereby be brought about, which would run over the marked row input lead *zz*1, the coupling relay K11, the diode G*e*11, the column input lead *se*1, the defective diode G*en*1, the coupling relay K*n*1, the row input lead *zzn*, the coupling relay K*n*2, the diode G*en*2, the column input lead *se*2, the marking contact 1*s*2, the control lead *u*3, and the contact 44 of the engagement device ST. In this switching phase, however, a potential of +2 volts will be applied over the contact 40 to the row input lead *zzn* and over the contact 42 a potential of minus 26 volts will be applied to the column input lead *se*1. Thereby the coupling relay K*n*1 receives return activation. However, the two other coupling relays named in the previously described undesired and, in accord with the invention, prevented circuit K*n*2 and K11 remain unactivated, because the potentials of plus 2 volts and minus 26 volts connected over the contacts 40 and 42 assure that the diodes G*e*11 and G*en*2 remain in their blocking condition. The named circuit cannot come about because of the measures of the invention. The effect of this diode defect is limited to the coupling relay lying at the same coupling point.

Corresponding circuits would be brought about in the other three switching phases in the absence of the inventive measures, when in these cases one of the diodes G*p*11 through Gpnm in one of those columns is defective in the described manner, and in which no column input lead is connected over the marking contact to ground potential. Defects of these diodes will be limited, however, in the named first three switching phases in their effects in the same way to the coupling relay line at one end of the same coupling point in that, that in the first switching phase over the contacts 10 and 12, in the second switching phase over the contacts 20 and 22 and in the third switching phase over the contact 30 and 32 potentials of minus 2 volts and plus 36 volts will be applied (switched onto) the column input leads not connected over marking the contact with ground potential which serve the return of the coupling relay.

It is once again pointed out that the potentials of minus 2 volts and plus 26 volts, or plus 2 volts or minus 26 volts will be routed to the pertinent column input leads which serve the return of the coupling relay, or the engagement of the coupling relays, over the marking contacts and over the control leads which link together (integrate or collect) their working sides, or rest sides. For the application of these potentials the marking contacts and the control leads common to them will be utilized in an advantageous manner, the same goes also for the relays of the control device ST which carry the control contacts.

Finally, the importance of the contacts 15, 25, 35 and 45 is to be pointed out. In accord with the invention, as explained above, with the marking of a coupling relay, for example K12, for the engagement of which by means of the connection of the marking negative voltage source onto a row input lead, for example, *zz*1, and with onto a column input lead which serves the engagement, for example *se*2. At the same time, a potential will be connected to the unmarked row input leads, for example *zz*1 through *zzn* with the exception of *zz*1, which potentially is equal to or positive in comparison with the functional potential at the marked column input lead (for example *se*2). It is now assumed that the diode G*p*12 is defective in the described manner. That is, it has a low resistance in the blocking direction. In the case that the potential connected to the unmarked row input leads is equal to that potential which is functional at the marked column input leads the named diode defect has practically no effect. In the case, however, that the potential switched on to the unmarked row input leads is positive with respect to that potential which is functional at the marked column input lead, an undesired circuit is brought about, which as will be shown, will be cut off by the operating of the contact 45 in the fourth switching phase (engagement of the relay K12).

In this circuit condition of the engagement activation of the relay K12 a marking potential of minus 24 volts lies on the row input lead *zz*1. The ground potential lies at the column input lead *se*2 as marking potential. At the diode G*e*12, there occurs a voltage drop of approximately 1 volt. Accordingly, at the connecting point between the diodes G*e*12 and G*p*12, there lies a potential of approximately minus 1 volt. As has previously been explained, there lies in this circuit condition a potential of +2 volts at the unconnected row input lead, for example *zzn*. If one proceeds from the point, that the contact 45 were omitted, then there would, in dependence on the defect of the diode G*p*12, be a potential of minus 1 volt at the column input lead *sr*2, and accordingly, there would be at the coupling relay K*n*2 and the diode G*pn*2 collectively, a voltage of 3 volts (a total voltage of 3 volts), whereby the diode G*pns* would allow the passage of current. The relay K*n*2 would thereby receive a position return activation. In the same manner the further, not shown coupling relays of the same column with the exception of the marked coupling relay would receive a return activation.

To overcome this undesired effect, the contact 45 is provided and in the fourth switching phase it connects a potential of minus 4 volts onto the column input lead of the marked column which permits the return. The connection of this potential has the effect that the effect of this diode defect remains limited to that coupling relay K12 which lies at the same coupling point. The remaining diodes which lie in the circuit for the return of the coupling relays, for example G*pn*2, or the column will be poled in the blocking direction.

Corresponding circuits would be brought about in the other three switching phases when the invention is not used. In such cases, one of the diodes Ge11 through Genm in one of those columns was defective in the described manner, in which column one column input lead which serves the return of the coupling relay is connected over the marking contact to the ground potential. Effects resulting from defects in these diodes will be limited, however, in the named first three switching phases in the same way to the coupling relay lying at one end the same coupling point. That is, in the first switching phase over the contact 15, in the second switching phase over the contact 25 and in the third switching phase over the contact 35 a potential of minus 4 volts will be connected to the column input lead not connected over a marked contact with ground potential, which serves the engagement of the coupling relay.

The preferred embodiment of the invention described hereinabove is considered only to be exemplary of the principles of this invention. The scope of the invention is defined by the appended claims and is not to be considered limited to the embodiment of the invention described hereinabove.

We claim:

1. In a telecommunication exchange switching installation having coupling matrices constructed of bistable switching relays, which relays can be set to an active state or reset to an inactive state individually, said relays having a coil, one end which is connected to opposite poles of a pair of rectifiers, the other terminals of said rectifiers being connected, respectively, to a markable column engagement lead and a markable column return lead, said installation having additionally a bipolar marking voltage source which, for operation of one of said relays, will have one polarity connected to the row input lead coupled to said one relay and one of said polarities connected to said column setting lead or the other polarity connected to said column resetting lead, depending upon whether a setting or resetting of the relay is to take place, the combination comprising:

first blocking voltage source means connected, simultaneously with the marking of one of said relays for either setting or resetting, to one of all of the unmarked column setting leads or all of the column resetting leads, said first blocking voltage source being constructed to produce a voltage of said one polarity and which is equal to or of a greater magnitude than the marking voltage applied to said marked column setting lead or of said other polarity and equal to or of a greater magnitude than the marking voltage applied to a marked column return lead, second blocking voltage source means connected, simultaneously with the marking of one of said relays for engagement or return, to one of all the unmarked column setting leads or all the unmarked column resetting leads, said second blocking voltage means being constructed to produce a voltage for application to said unmarked column setting leads or said unmarked column resetting leads which is of the same polarity as and equal to or of a greater magnitude than the marking voltage applied to said marked row input lead and third blocking voltage source means connected, simultaneously with the marking of one of said relays for setting or resetting, to the unmarked row input leads, said third voltage source means being constructed to apply a voltage of said one polarity and of equal or greater magnitude than the voltage applied to a marked column engagement lead or a voltage of said other polarity and of equal or greater magnitude than the voltage applied to a marked column resetting lead.

2. The switching installation defined in claim 1 wherein the coupling relays completing a connection over a row and a column lead have contacts which remain engaged after the release of said connection and are returned only when a new connection is completed over one of said row and column leads.

3. The switching installation defined in claim 2 wherein marking said leads is accomplished using double throw switch means having center terminals common to the rest and operative sides individually connected to one of said input leads, one of said switches being assigned to each of said row input, column engagement and column return leads.

4. The switching installation defined in claim 1 wherein for marking a relay for setting the marking voltage source applies a negative voltage to a row input lead and for marking a relay for resetting said marking voltage source applies a positive voltage to a row input lead and wherein the voltage connected simultaneously to the unmarked column resetting leads is equal or more positive than the voltage simultaneously connected to the unmarked row leads and the voltage connected simultaneously to the unmarked column setting leads is equal or more negative than the voltage simultaneously connected to the unmarked row leads.

5. The switching installation defined in claim 1 wherein for marking the relay for a setting operation said marking voltage source is connected to the marked row input lead as to apply a negative voltage thereto and to a column setting lead as to apply a positive voltage thereto and for marking a resetting operation said marking voltage source is connected to the marked row input lead as to apply a positive voltage thereto, and wherein a voltage is connected simultaneously to a marked column resetting lead which is equal to or more positive than the voltage connected to the unmarked row leads and a voltage is connected simultaneously to the marked column setting lead which is equal to or more negative than the unmarked row leads.

* * * * *